United States Patent
Hee et al.

[11] Patent Number: 6,167,080
[45] Date of Patent: Dec. 26, 2000

[54] CONTROL LOOP FOR ADAPTIVE EQUALIZATION OF A DATA SIGNAL

[75] Inventors: Wong Hee, San Jose; Abhijit Phanse, Santa Clara, both of Calif.

[73] Assignee: National Semiconductor Corporation, Santa Clara, Calif.

[21] Appl. No.: 09/076,260

[22] Filed: May 12, 1998

Related U.S. Application Data

[60] Provisional application No. 60/069,027, Dec. 10, 1997, provisional application No. 60/069,044, Dec. 10, 1997, provisional application No. 60/069,031, Dec. 10, 1997, provisional application No. 60/069,091, Dec. 10, 1997, provisional application No. 60/069,030, Dec. 10, 1997, provisional application No. 60/069,028, Dec. 10, 1997, provisional application No. 60/069,029, Dec. 10, 1997, and provisional application No. 60/067,764, Dec. 10, 1997.

[51] Int. Cl.[7] .............. H03K 5/159; H03H 7/30; H03H 7/40

[52] U.S. Cl. .............. 375/232; 375/236; 375/317; 375/287

[58] Field of Search .............. 375/236, 232, 375/317

[56] References Cited

U.S. PATENT DOCUMENTS

| | | | |
|---|---|---|---|
| 4,479,266 | 10/1984 | Eumurian et al. | 327/72 |
| 5,243,625 | 9/1993 | Verbakel et al. | 375/317 |
| 5,367,535 | 11/1994 | Scholz | 375/287 |
| 5,652,533 | 7/1997 | Wong et al. | 327/76 |
| 5,940,442 | 8/1999 | Wong et al. | 375/232 |
| 6,043,766 | 3/2000 | Hee et al. | 341/94 |

*Primary Examiner*—Stephen Chin
*Assistant Examiner*—Paul N. Rupert
*Attorney, Agent, or Firm*—Baker & McKenzie

[57] ABSTRACT

A closed feedback loop controls the adaptive equalization of an incoming data signal received via a cable. Detected signal information about the positive and negative peaks of the incoming data signal during different windows in time is processed to generate a set of adaptive equalization control signals which identify differences, if any, between the positive and negative peaks of the present data signal and those which are desired. These equalization control signals control an input signal equalization circuit which adaptively adjusts the waveshape of the present data signal to bring it into conformance with the desired waveshape.

12 Claims, 7 Drawing Sheets

Microfiche Appendix Included
(3 Microfiche, 293 Pages)

CONTROL LOOP FOR ADAPTIVE EQUALIZATION OF A DATA SIGNAL

RELATED APPLICATIONS

This application claims the benefit of and incorporates herein by reference the following U.S. provisional patent applications:

60/069,027, filed Dec. 10, 1997, entitled "Peak Error Detector"

60/069,044, filed Dec. 10, 1997, entitled "Signal Gating Controller For Enhancing Convergency of MLT3 Data Receivers"

60/069,031, filed Dec. 10, 1997, entitled "Digital Interface Circuit"

60/069,091, filed Dec. 10, 1997, entitled "Digital Signal Processing Control Circuit For Controlling Corrections of Input Data Signal Errors"

60/069,030, filed Dec. 10, 1997, entitled "Control Loop For Data Signal Baseline Correction"

60/069,028, filed Dec. 10, 1997, entitled "Control Loop For Adaptive Equalization of a Data Signal"

60/069,029, filed Dec. 10, 1997, entitled "Control Loop For Multilevel Sampling of a Data Signal"

60/067,764, filed Dec. 10, 1997, entitled "Data Signal Baseline Error Detector"

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyright rights whatsoever.

This application is submitted with a microfiche appendix containing copyrighted material, copyright 1996, National Semiconductor Corporation. Such appendix consists of 3 microfiche transparencies with a total of 293 frames.

BACKGROUND OF THE INVENTION

1. Field of the Invention

The present invention relates to data receivers for receiving high data rate signals from long lengths of cable, and in particular, data receivers for receiving high data rate, binary or MLT3 encoded data signals from long lengths of cable, while providing signal baseline restoration, adaptive signal equalization and dynamic data signal slicing.

2. Description of the Related Art

Recovering data which has been transmitted over a long length of cable at high rates requires that such data be equalized in order to compensate for the loss and phase dispersion of the cable. Further, in those applications where the cable length may vary, such equalization must be based upon a complementary transfer function which is capable of adapting accordingly since the transfer function of the cable varies with the length of the cable. This type of data recovery is generally done using three functions: a filter function; a dc restoration and slicing function; and an adaptation control, or servo, function.

The filter function is performed using a complementary (with respect to the complex cable loss characteristic) filter which synthesizes the inverse of the transfer function of the cable. Since the bit error rate (BER) is directly related to jitter, an important performance metric for an equalizer is jitter within the output waveform. The extent to which the equalizer is able to match the inverse of the complex cable loss characteristic determines the extent to which inter-symbol interference induced jitter is eliminated. The dc restoration function is necessary to ensure that the equalized incoming signal is properly centered within the dynamic range of the data recovery system so as to allow for accurate signal slicing. The slicing function is used to extract the data from the equalized signal.

The adaptation control, or servo, function is necessary to ensure that the data recovery system is able to adapt to changes in the incoming data signal, such as increases and decreases in signal amplitude and changes in signal phase, as well as changes in the operating environment.

SUMMARY OF THE INVENTION

In accordance with one embodiment of the present invention, a control loop for controlling an adaptive equalization of a data signal includes a signal equalization circuit, a data signal peak detection circuit, a signal processing circuit and an equalization control circuit. The signal equalization circuit is configured to receive and process one or more equalization control signals and in accordance therewith receive and adaptively equalize an input data signal from a cable and in accordance therewith provide an equalized data signal which corresponds to the input data signal. The data signal peak detection circuit is coupled to the signal equalization circuit and is configured to receive and detect the equalized data signal and in accordance therewith provide a plurality of peak parameter signals which indicates whether the equalized data signal has transcended a plurality of predetermined signal levels including predetermined minimum and maximum signal levels. The signal processing circuit is coupled to the data signal peak detection circuit and is configured to receive and process the plurality of peak parameter signals and in accordance therewith provide: a first processed parameter signal which indicates whether the equalized data signal has transcended one of the predetermined minimum and maximum signal levels; a second processed parameter signal which indicates which one of the predetermined minimum and maximum signal levels the equalized data signal has transcended; a third processed parameter signal which indicates whether the equalized data signal has transcended a first predetermined midrange signal level intermediate to a predetermined mean value of the equalized data signal and the predetermined maximum signal level, or has transcended a second predetermined midrange signal level intermediate to the predetermined mean value of the equalized data signal and the predetermined minimum signal level; and a fourth processed parameter signal which indicates which one of the first and second predetermined midrange signal levels the equalized data signal has transcended. The equalization control circuit is coupled to the signal processing circuit and the signal equalization circuit and is configured to receive and process the first, second, third and fourth processed parameter signals and in accordance therewith provide the one or more equalization control signals.

In accordance with another embodiment of the present invention, a method of controlling an adaptive equalization of a data signal with a control loop includes the steps of:

receiving and processing one or more equalization control signals and in accordance therewith receiving and adaptively equalizing an input data signal from a cable and in accordance therewith generating an equalized data signal which corresponds to the input data signal;

detecting the equalized data signal and in accordance therewith generating a plurality of peak parameter signals which indicates whether the equalized data signal has transcended a plurality of predetermined signal levels including predetermined minimum and maximum signal levels;

processing the plurality of peak parameter signals and in accordance therewith generating a first processed parameter signal which indicates whether the equalized data signal has transcended one of the predetermined minimum and maximum signal levels, a second processed parameter signal which indicates which one of the predetermined minimum and maximum signal levels the equalized data signal has transcended, a third processed parameter signal which indicates whether the equalized data signal has transcended a first predetermined midrange signal level intermediate to a predetermined mean value of the equalized data signal and the predetermined maximum signal level, or has transcended a second predetermined midrange signal level intermediate to the predetermined mean value of the equalized data signal and the predetermined minimum signal level, and a fourth processed parameter signal which indicates which one of the first and second predetermined midrange signal levels the equalized data signal has transcended; and processing the first, second, third and fourth processed parameter signals and in accordance therewith generating the one or more equalization control signals.

These and other features and advantages of the present invention will be understood upon consideration of the following detailed description of the invention and the accompanying drawings.

DETAILED DESCRIPTION OF THE INVENTION

Figure 1:
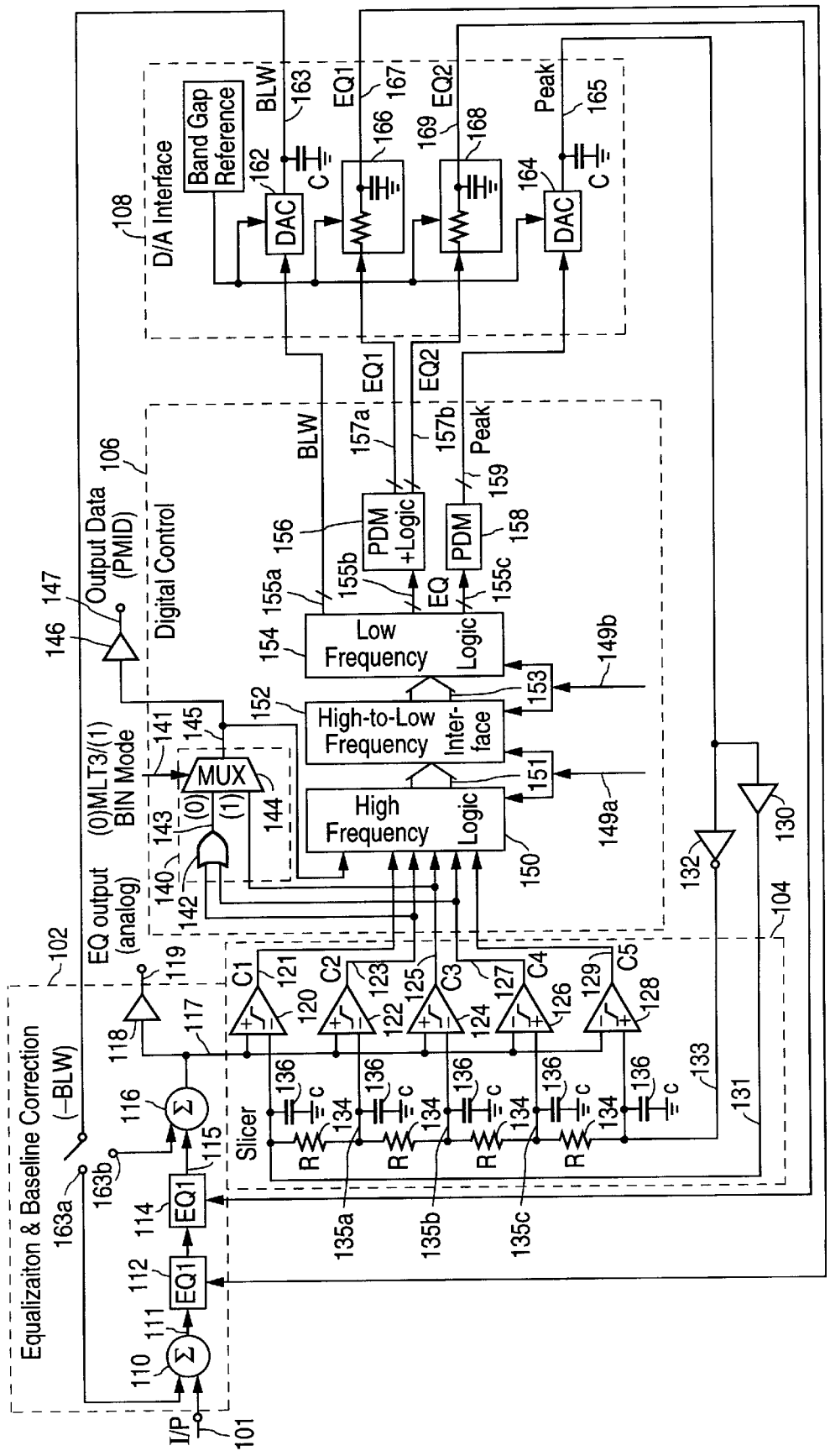
FIG. 1 is a functional block diagram of a high speed data receiver in accordance with one embodiment of the present invention.

Referring to FIG. 1, a circuit in accordance with the present invention is advantageous for use in a high speed data receiver 100 which receives binary or MLT3 encoded data which has been transmitted via a cable (e.g., fast Ethernet). As discussed in more detail below, such a data receiver 100 provides adaptive equalization and dynamic slicing and baseline restoration of the data signal. (A description of a similar data receiver can be found in co-pending, commonly assigned U.S. patent application Ser. No. 08/791,381, filed Jan. 30, 1997, and entitled "High Speed Data Receiver," the disclosure of which is incorporated herein by reference.)

This data receiver 100 includes a correction stage 102, a slicer stage 104, a digital control stage 106 and a digital-to-analog (D/A) interface 108. As discussed in more detail below, the correction stage 102 provides for equalization and baseline wander correction of the input data signal 101. The slicer stage 104 slices the resulting equalized, corrected data signal 117. The digital control stage 106 processes some of the sliced data signals to produce an output digital data signal 147, as well as generate a number of digital control signals 155a, 157a, 157b, 159 for controlling the equalization, baseline wander correction and slicing of the input data signal 101. The D/A interface 108 converts such digital control signals 155a, 157a, 157b, 159 into corresponding analog signals 163, 165, 167, 169 for actually providing such control of the equalization, baseline wander correction and slicing of the input data signal 101. The incoming data signal 101, which has been received via a long cable of variable length (not shown), is selectively combined with a baseline correction signal 163 (discussed further below) in a signal summer 110. The corrected signal 111 is selectively amplified by a series of adaptive equalizers, 112, 114, which each have a signal gain which increases with frequency in accordance with their respective equalizer control signals 167, 169. The resulting equalized signal 115 is selectively combined with an alternative baseline correction signal 163 in another signal summer 116. (For testing purposes, the final equalized, corrected data signal 117 is buffered by an analog buffer amplifier 118 to be provided as an analog, equalized, corrected output data signal 119, and is also provided to the signal slicer 104.)

A description of a signal equalization technique using a series of signal equalizers in this manner can be found in co-pending, commonly assigned U.S. patent application Ser. No. 08/791,382, filed Jan. 30, 1997, and entitled "Multiple Stage Adaptive Equalizer," the disclosure of which is incorporated herein by reference.

The slicer 104 receives and slices the equalized, corrected data signal 117 in accordance with positive 131 and negative 133 data peak reference signals using a set of voltage comparators 120, 122, 124, 126, 128. The positive 131 and the negative 133 data peak reference signals are the buffered, non-inverted and inverted versions of a data peak signal 165 (discussed further below) as generated by non-inverting 130 and inverting 132 buffer amplifiers, respectively. These data peak reference signals 131, 133 are applied differentially across a resistive voltage divider with four resisters 134, thereby generating five respective reference signals 131, 135a, 135b, 135c, 133, each of which is filtered by a capacitor 136 for use as a reference signal for its respective voltage comparator 120, 122, 124, 126, 128. Based upon these reference signals, 131, 135a, 135b, 135c, 133, each comparator 120, 122, 124, 126, 128 produces a respective binary output signal 121, 123, 125, 127, 129, each of which is asserted at a logic one level when the data signal 117 transcends the value of the corresponding reference input signal 131, 135a, 135b, 135c, 133.

For example, for the positive 120 and negative 128 peak voltage comparators, the positive 131 and negative 133 data peak reference signals serve as their reference signals, respectively. The middle reference signal 135b represents the mean (e.g., zero or baseline) and serves as the reference signal for the middle comparator 124. The remaining positive reference signal 135a represents a voltage between the mean voltage 135b and the positive peak voltage 131 and serves as the reference for the positive level comparator 122. Similarly, the remaining negative reference 135c represents a voltage between the mean voltage 135b and the negative peak voltage 133 and serves as the reference for the negative level comparator 126.

The binary data signals 121, 123, 125, 127, 129 are received and processed by the digital control stage 106 as follows. The mean 125, positive 123 and negative 127 data signals are processed by a decoder 140 to produce a data signal 145 which is buffered by a buffer amplifier 146 to produce the output digital data signal 147. The positive 123 and negative 127 data signals are logically summed in an OR Gate 142. Then, either the resulting logical sum signal 143 or mean data signal 125 is selected with a multiplexor 144 in accordance with a control signal 141, depending upon whether the original input data signal 101 is an MLT3 or binary signal. This data signal 145 and the binary data signals 121, 123, 125, 127, 129 are received and processed by a high frequency logic stage 150 in accordance with a high frequency clock signal 149a.

The high frequency logic stage 150 processes its input signals 145, 121, 123, 125, 127, 129 in a number of ways to produce a set 151 of digital signals which are then converted to a corresponding set 153 of digital signals at a lower frequency by the high-to-low frequency stage 152 in accordance with the high frequency clock signal 149a and a low frequency clock signal 149b. (By way of example, for fast Ethernet, the high frequency clock signal 149a has a frequency in the hundreds of megahertz and the low frequency clock signal 149b has a frequency in the tens of megahertz.) One operation performed by the high frequency logic stage 150 is that of peak error detection, whereby multiple peak error signals representing variations in the signal peaks within selected frequency bands of the incoming data signal are validated so as to identify the occurrence of errors between the peak of the present incoming data signal and estimated peak values of prior incoming data signals within different time windows. A description of this peak error detection circuit can be found in co-pending, commonly assigned U.S. patent application Ser. No. 09/076,186 filed May 12, 1998, and entitled "Peak Error Detector", the disclosure of which is incorporated herein by reference. Another operation performed is that of baseline error detection, whereby a baseline error signal which is generated during an intermediate level state of the multiple level data signal 117 (such as the zero-state of an MLT3 signal) is validated, thereby identifying the occurrence of an error between the baseline of the incoming data signal and an estimated baseline level. A description of this baseline error detection circuit can be found in co-pending, commonly assigned U.S. patent application Ser. No. 09/076,261, filed May 12, 1998, and entitled "Data Signal Baseline Error Detector" (attorney docket no. NSC1-C1010), the disclosure of which is incorporated herein by reference. Yet another operation performed is that of generating gating control signals for gating out false signal pulses caused by improper equalization of the original incoming data signal 101. A description of this gating control circuit can be found in co-pending, commonly assigned U.S. patent application Ser. No. 09/096,187, filed May 12, 1998, and entitled "Signal Gating Controller for Enhancing Convergency of MLT3 Data Receivers", the disclosure of which is incorporated herein by reference.

The low frequency logic stage 154, in accordance with the low frequency clock signal 149b, processes these lower frequency signals 153 to produce a number of digital control signals 155a, 155b, 155c. More specifically, the low frequency logic stage 154 processes the lower frequency error signals 153 to produce control signals for compensating for variations in peak signal values and correcting errors in the baseline of the incoming data signal 111/115, as well as controlling the equalization of the incoming data signal 111. A more detailed description of the low frequency logic stage 154 can be found in co-pending, commonly assigned U.S. patent application Ser. No. 09/076,187, filed May 12, 1998, and entitled "Distributive Encoder For Encoding Error Signals Which Represent Signal Peak Errors In Data Signals For Identifying Erroneous Signal Baseline, Peak And Equalization Conditions", the disclosure of which is incorporated herein by reference.

The high-to-low frequency interface 152, in accordance with the high 149a and low 149b frequency clock signals, converts the incoming error signals 151 to a corresponding set 153 of lower frequency error signals. A more detailed description of this interface 152 can be found in co-pending, commonly assigned U.S. patent application Ser. No. 09/076, 263,filed May 12 1998, and entitled "Digital Interface Circuit", the disclosure of which is incorporated herein by reference.

One set 155a of control signals produced by the low frequency logic stage 154 is used for correcting baseline wander of the original input data signal 101. This set 155a of digital signals is converted to an analog baseline wander control signal 163 by way of a digital-to-analog converter 162. This analog control signal 163 is then summed with either the original input data signal 101 or the equalized input data signal 115, as discussed above.

Another set 155b of control signals is used to generate the equalization control signals 167, 169 for the adaptive equalizers 112, 114 (discussed above). This set 155b of signals is processed using a circuit 156 which includes a pulse density modulator and some associated logic circuitry to produce, in turn, two pulse density modulated control signals 157a, 157b for controlling the two adaptive input signal equalizers 112, 114. Each of these signals 157a, 157b is converted to its respective analog control signal 167, 169 with a resistive-capacitive digital-to-analog conversion circuit 166, 168. A more detailed description of this signal converter can be found in co-pending, commonly assigned U.S. patent application Ser. No. 08/791,367 filed Jan. 30, 1997, and entitled "Distributive Digital-to-Analog Converter," the disclosure of which is incorporated herein by reference.

Yet another set of control signals 155c is used to generate an analog peak signal 165 which is used to generate the differential peak reference signals 131, 133 for the slicer 104, as discussed above. These digital signals 155c are converted with a pulse density modulator 158 to produce a set 159 of pulse density modulated signals which, in turn, are then converted to the analog peak signal 165 by a digital-to-analog converter 164.

Figure 2:
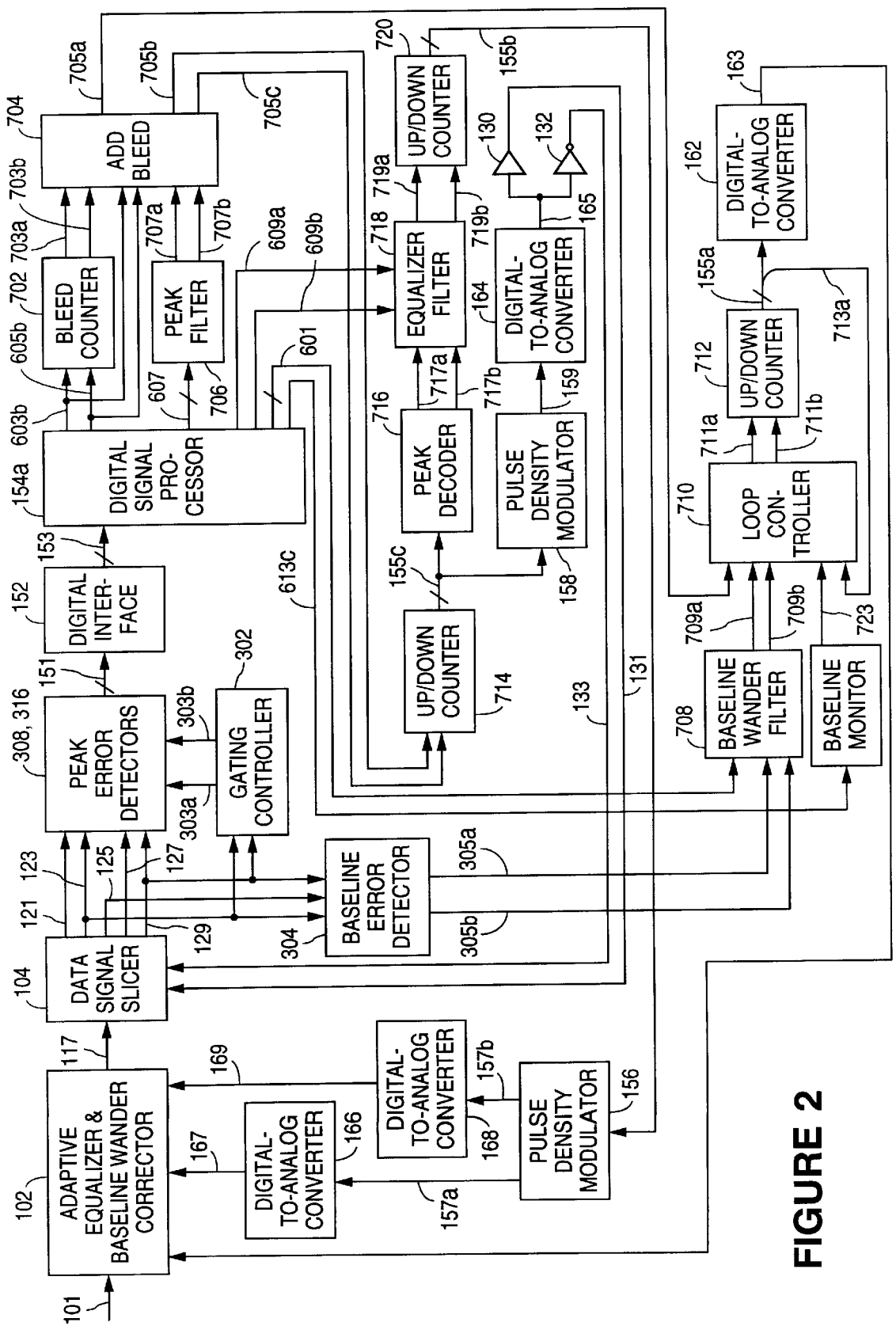
FIG. 2 is a more detailed functional block diagram of portions of the high speed data receiver circuit of FIG. 1.

Referring to FIG. 2, the high speed data receiver of FIG. 1, represented in part in more detail and in a manner to more clearly identify the present invention, includes three control loops: a baseline wander correction control loop; a signal equalization control loop; and a signal peak tracking loop. The operation of each of these loops will now be discussed in detail. Each of the circuit functions or stages as represented in FIG. 2 and discussed below are described in detail in the code listings provided in the microfiche appendix hereto, the contents of which are incorporated herein by reference. As discussed above in connection with FIG. 1, the incoming data signal 101 has its baseline established and maintained and is adaptively equalized in the adaptive equalizer and baseline wander corrector stage 102 in accordance with a baseline correction signal 163 and equalizer control signals 167, 169. The resulting signal 117 is then detected, or sliced, in the data signal slicer stage 104. Using positive 131 and negative 133 data peak reference signals, the slicer 104 produces five binary output signals 121, 123, 125, 127, 129.

Figure 3:
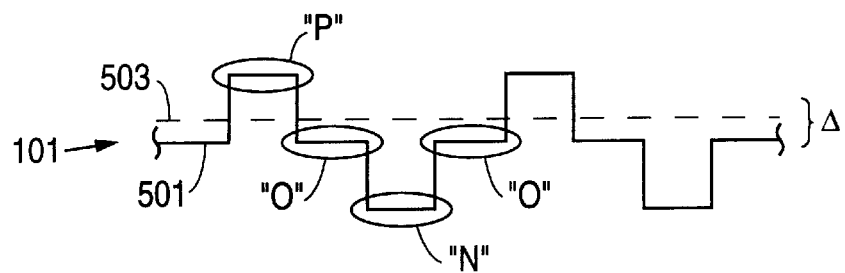
FIG. 3 is an idealized representation of a multiple level signal waveform with a shifted baseline which is correctable with the circuit of FIG. 2.

These binary data signals 121, 123, 125, 127 and 129 are selectively used by the baseline error detector 304, the gating controller 302, and the peak error detectors 308, 316. As discussed in more detail in the above-referenced application entitled "Data Signal Baseline Error Detector," the baseline error detector 304 monitors the positive 123, mean 125 and negative 127 data signals from the slicer 104 and generates two output signals 305*a*, 305*b*. Referring to FIG. 3, the first signal 305*a* represents the direction, or polarity, of the error between the present 501 and preceding 503 signal 101 baselines. The second signal 305*b* is a validation signal which validates the state of the first error signal 305*a* by identifying those points in time when the data signal 101 is in its intermediate, or zero "0," state.

As discussed in more detail in the above-referenced application entitled "Signal Gating Controller for Enhancing Convergency of MLT3 Data Receivers," the gating controller 302 monitors the positive 123 and negative 127 data signals from slicer 104 and generates two output signals 303*a*, 303*b*. These signals 303*a*, 303*b* serve as positive and negative gating control signals for the peak error detectors 308, 316.

As discussed in more detail in the above-referenced application entitled "Peak Error Detector," the peak error detectors 308, 316, in accordance with the gating control signals 303*a*, 303*b*, process the positive 121 and negative 129 peak signals and the positive 123 and negative 127 data signals from the slicer 104 to generate multiple peak error signals 151.

Figure 4:
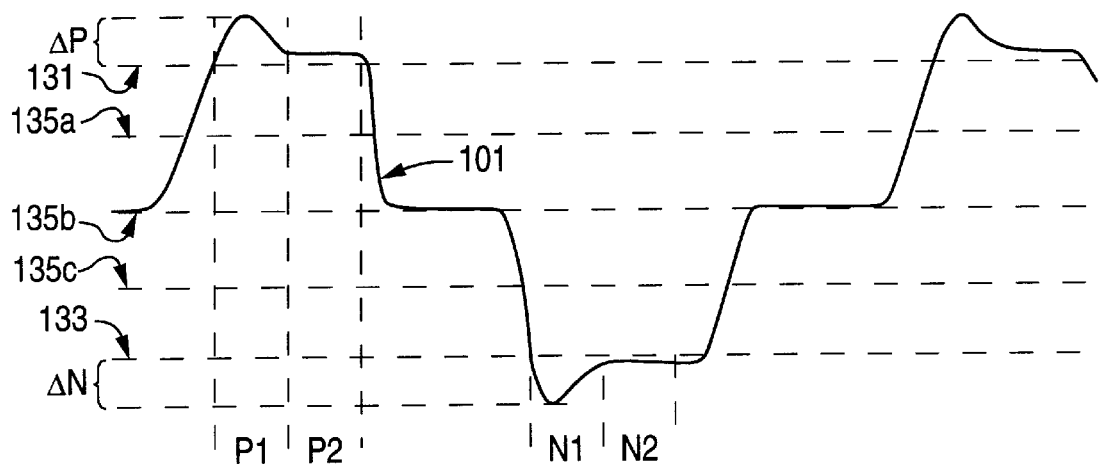
FIG. 4 is a graph of a signal waveform for a multiple level signal which can be detected, equalized and baseline corrected with the circuit of FIG. 2.

As discussed in more detail in the above-referenced application entitled "Digital Interface Circuit," the digital interface stage 152 converts the peak error signals 151 to a corresponding set 153 of lower frequency error signals for further processing by the digital signal processor 154*a* (which forms part of the low frequency logic stage 154 (FIG. 1)). More specifically, the digital signal processor 154*a* functions as a filter for filtering out redundant error information within defined data signal time windows (discussed below in reference to time slots P1, P2, N1 and N2 as represented in FIG. 4). Basically, error information in the form of error signal pulses is monitored within each defined time window. If only one error signal pulse is present, then it is captured for use as one of the output error signals 153. If more than one error signal pulse is present, then the last one is captured for use as one of the output error signals 153.

As discussed in more detail in the above-referenced application entitled "Distributive Encoder For Encoding Error Signals Which Represent Signal Peak Errors In Data Signals For Identifying Erroneous Signal Baseline, Peak And Equalization Conditions," the digital signal processor 154*a* uses the reduced frequency error signals 153 to produce a number of output signals 601, 603*b*, 605*b*, 607, 609*a*, 609*b*, 613*c*. One of the signals 601 is a multiple bit baseline error signal which, based upon positive and negative peak signal information, indicates whether the present data signal baseline 501 has wandered from a prior data signal baseline 503 (FIG. 3) and corresponds to valid signal activity, i.e., during the positive "P" and negative "N" data signal excursions. Another signal 613*c* indicates when the equalized corrected data signal 117 fails to transcend the desired data signal baseline between consecutive positive ("PP") or negative ("NN") data signal pulses.

Two other signals 609*a*, 609*b* are provided which are used in controlling adaptive equalization of the incoming data signal 101 (discussed in more detail below). Referring to FIG. 4, these signals 609*a*, 609*b* correspond to the P2 and N2 time periods, or slots, of the data signal 101 and are based upon present P2/N2 signal information and prior (e.g., average) P1/N1 signal information. Of these two signals 609*a*, 609*b*, one signal 609*a*, when asserted, indicates when the equalized data signal 117 has transcended one of the predetermined maximum 131 or minimum 133 signal levels (FIG. 4), while the other signal 609*b*, when asserted, identifies contemporaneous assertions of the first signal 609*a* as being valid.

Figure 5:
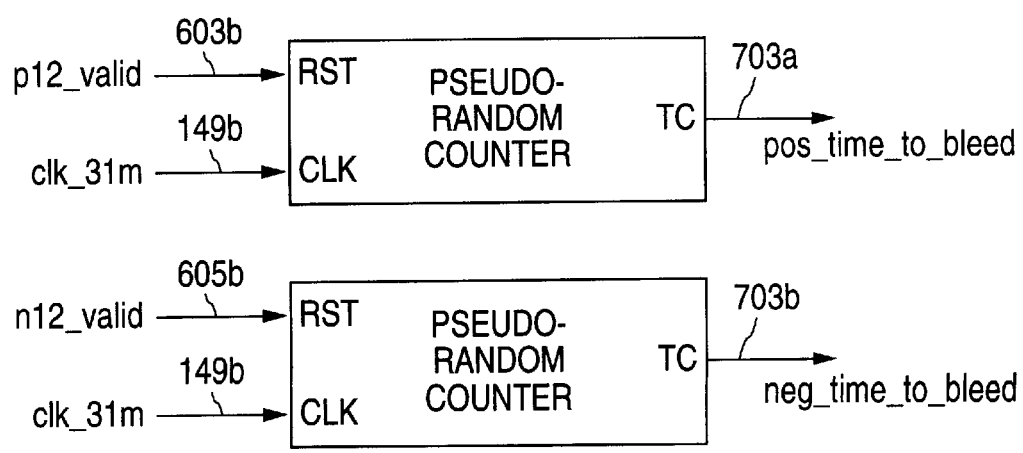
FIG. 5 is a functional block diagram of the bleed counter stage in the circuit of FIG. 2.

Two validation signals 603*b*, 605*b* are provided which correspond to the positive P1, P2 and negative N1, N2 time periods of the data signal 101 (FIG. 4), with the first signal 603*b*, when asserted, indicating erroneous data signal peaks during one or more of the positive P1, P2 time periods, and the second signal 605*b*, when asserted, indicating erroneous data signal peaks during one or more of the negative N1, N2 time periods. Referring to FIG. 5, these signals 603*b*, 605*b* serve as reset signals for pseudorandom counters inside the bleed counter stage 702. The resulting terminal count signals 703*a*, 703*b* are provided, as are the original input signals 603*b*, 605*b* also, to the add bleed stage 704.

Figure 6:
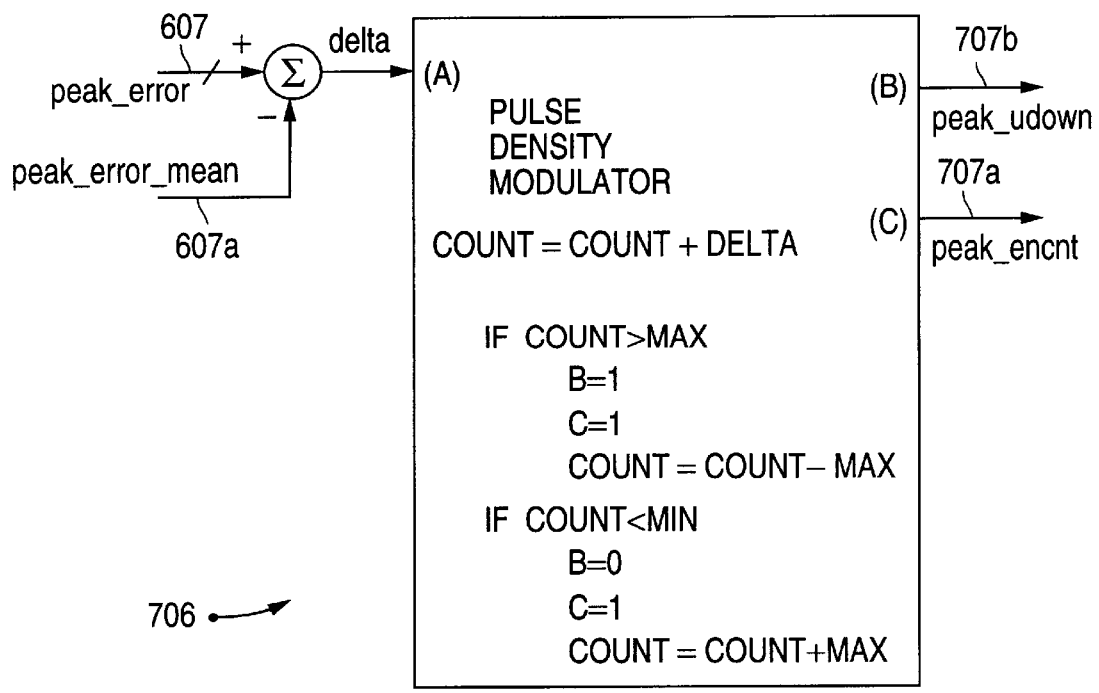
FIG. 6 is a functional block diagram of the peak filter stage in the circuit of FIG. 2.

Another multiple bit signal 607, representing unsigned peak error information (i.e., with no polarity information) and provided by the digital signal processor 154*a*, is processed by the peak filter stage 706. Referring to FIG. 6, a peak error mean signal 607*a* (typically a constant value) is subtracted from this signal 607, with the resulting difference representing signed peak error information and used to drive a pulse density modulator. The resulting output signals 707*a*, 707*b* are provided to the add bleed stage 704. One signal 707*b* is used downstream to instruct a counter (discussed in more detail below in reference to up/down counter 714) to count either up or down, depending upon the state of such signal 707*b* which, in turn, is dependent upon the polarity of the error as represented by the peak error signal 607. The other signal 707*a* is used to enable such counter if and when an error is identified, and to disable such counter otherwise.

Figure 7:
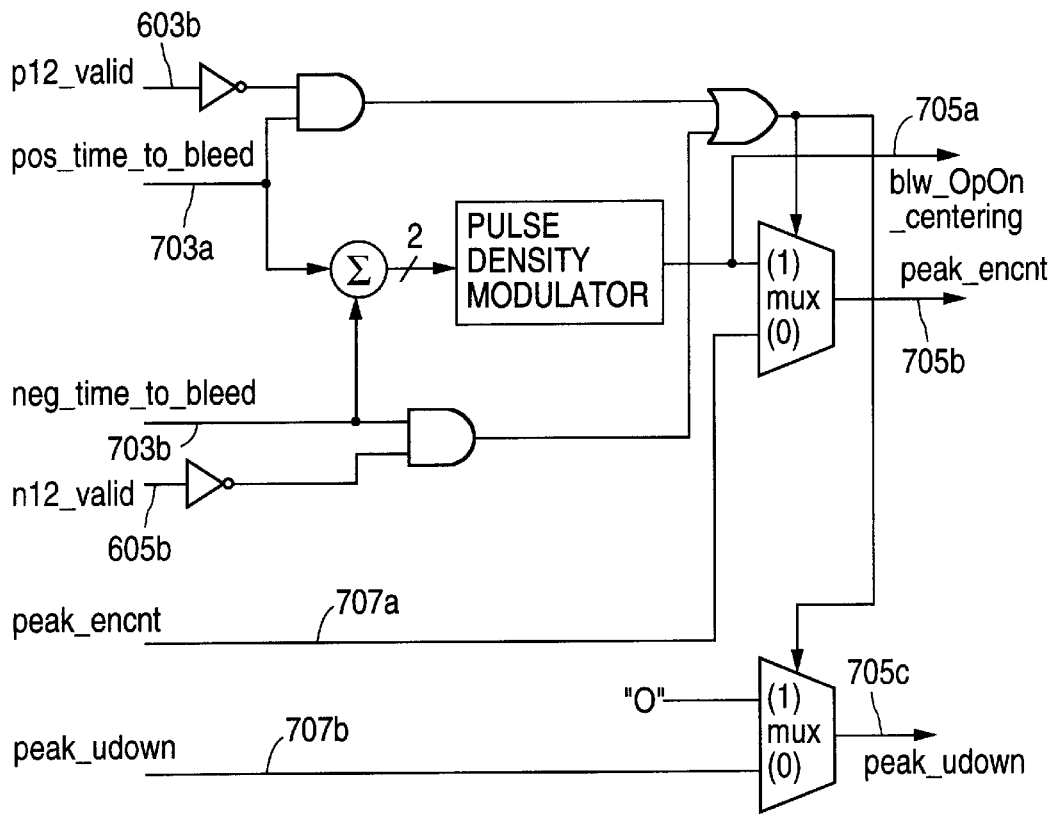
FIG. 7 is a logic and functional block diagram of the add bleed stage in the circuit of FIG. 2.

Referring to FIG. 7, the signals 603*b*, 605*b* from the digital signal processor 154*a*, the signals 703*a*, 703*b* from the bleed counter 702, and the signals 707*a*, 707*b* from the peak filter 706 are processed by the add bleed stage 704 according to the logic and functions as shown. This produces three signals. The first signal 705*a* indicates whether any positive P or negative N signal pulses (FIG. 3) are present in the data signal 117. The second signal 705*b*, when asserted, identifies contemporaneous assertions of the last signal 705*c* as being valid. The last signal 705*c* indicates whether the stored average signal peak information (provided to the data signal slicer 104 via the peak reference signals 131, 133)

requires updating by identifying which one of the mid-range signal thresholds 135a, 135c has been transcended by the equalized data signal 117. The stored average signal peak information is updated by providing updated positive 131 and negative 133 data peak reference signals. Due to the common analog input signal 165 to the buffer amplifiers 130, 132 (discussed in more detail below), this results in an overall expansion or contraction of the differential voltage range represented by the positive 131 and negative 133 data peak reference signals.

Baseline Correction Control Loop

Referring again to FIG. 2, the control loop for controlling the baseline correction of the incoming data signal 101 is completed by the interconnection and cooperation of a baseline wander filter stage 708, a loop controller stage 710, an up/down counter stage 712 and a digital-to-analog converter stage 162.

Figure 8:
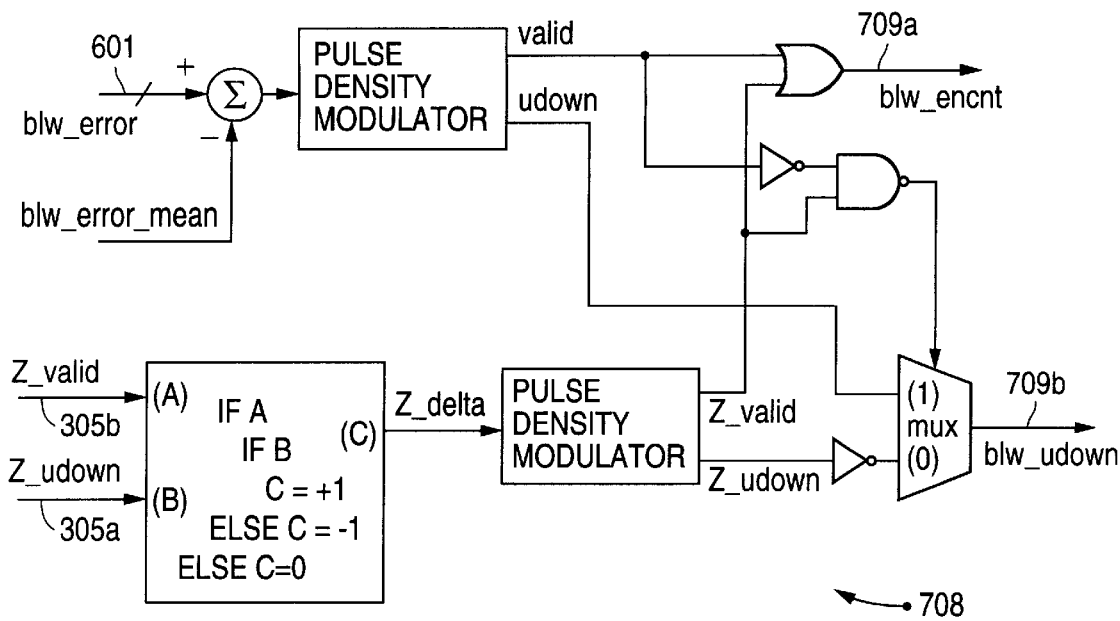
FIG. 8 is a logic and functional block diagram of the baseline wander filter stage in the circuit of FIG. 2.

Referring to FIG. 8, the baseline wander filter 708 receives the two signals 305a, 305b from the baseline error detector 304 and the baseline wander error signal 601 from the digital signal processor 154a and processes them in accordance with the functions and logic as shown. Of the resulting output signals 709a, 709b, one signal 709a is selectively used for enabling and disabling the up/down counter 712, while the other signal 709b selectively determines whether the counter 712 counts up or down. (The enablement signal 709a is asserted, and thereby enables the up/down counter 712, when a baseline error of any kind is detected.)

The error polarity 305a and validation 305b signals from the baseline error detector 304 represent baseline errors during periods when no data information is present within the incoming signal. These signals have a low priority and are used for correcting baseline errors caused by long term dc offset voltages. The baseline wander error signal 601 from the digital signal processor 154a, however, represents baseline errors during periods when data information is present within the incoming signal. Therefore, this signal 601 has a high priority when correcting for baseline errors.

Figure 9:
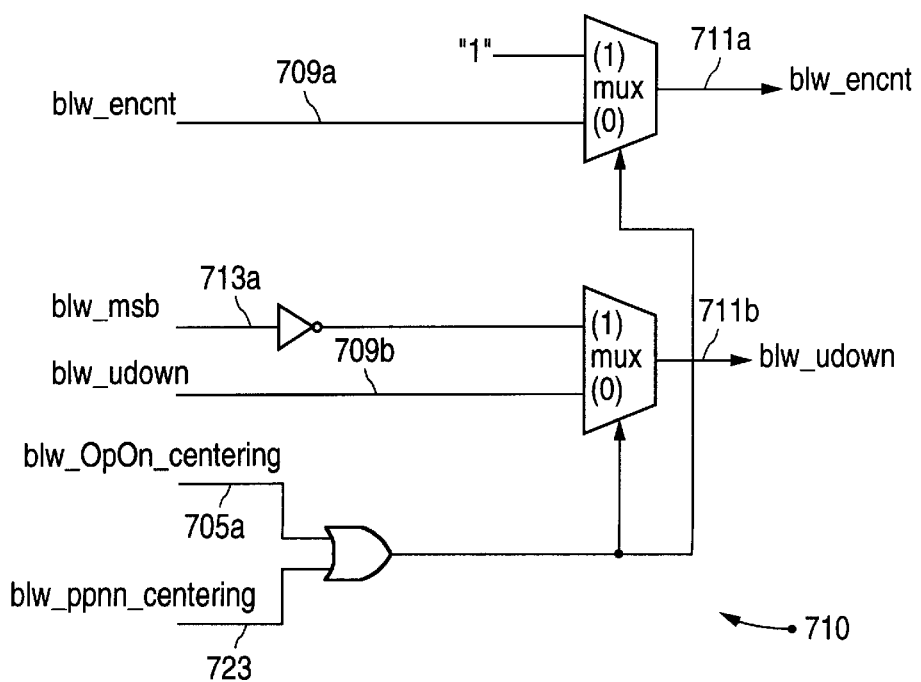
FIG. 9 is a logic and functional block diagram of the loop controller stage in the circuit of FIG. 2.

Referring to FIG. 9, these signals 709a, 709b, along with the most significant bit 713a from the output count signal 155a from the counter 712, plus a constant logic 1 signal, are multiplexed by the loop controller stage 710 in accordance with the baseline signal 705a from the add bleed stage 704 (discussed above) and a baseline "PPNN centering" signal 723 which identifies whether the data signal 101 has a baseline 501 which has shifted dramatically away from the previous baseline level 503. The first multiplexed output signal 711a is used to enable and disable the up/down counter 712, while the second multiplexed signal 711b instructs the counter 712 to count up or down.

Figure 10:
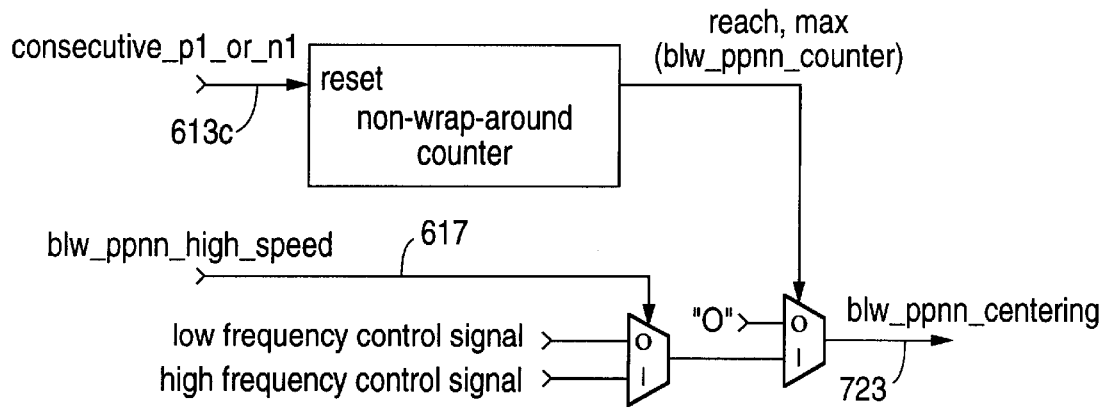
FIG. 10 is a logic and functional block diagram of the baseline monitor stage in the circuit of FIG. 2.

Referring to FIG. 10, the PPNN centering signal 723 is generated by using the signal 613c from the digital signal processor 154a which indicates when the equalized corrected data signal 117 fails to transcend the desired data signal baseline between consecutive positive ("PP") or negative ("NN") data signal pulses. This signal 613c selectively resets a counter the output of which is processed, along with a manual override signal 617, in accordance with the logic and functions as shown to produce the PPNN centering signal 723.

The multiple bit output count signal 155a from the counter 712 is converted to an analog signal 163 by the digital-to-analog converter 162. This analog signal 163, as discussed above, serves as the baseline correction signal for the adaptive equalizer and baseline wander corrector stage 102.

Adaptive Signal Equalization Control Loop

Referring again to FIG. 2, the control loop for controlling the adaptive equalization of the incoming data signal 101 is completed with an up/down counter stage 714, a peak decoder stage 716, an equalizer filter stage 718, another up/down counter stage 720, a pulse density modulator stage 156 and two digital-to-analog converter stages 166, 168, interconnected as shown. The first up/down counter 714 receives the two output signals 705b, 705c from the add bleed stage 704 which have been derived from the peak error signal 607. One signal 705b is used to enable and disable the counter 714, while the other signal 705c determines whether the counter 714 counts up or down.

Figure 11:
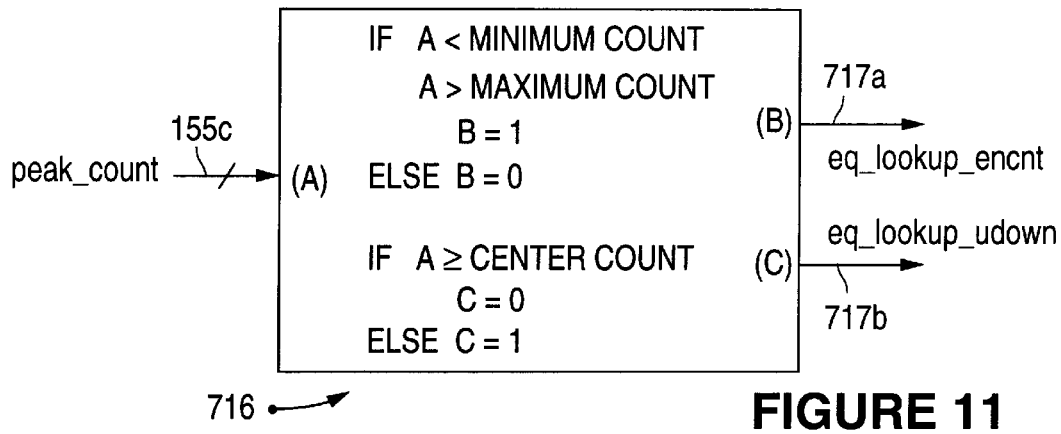
FIG. 11 is a functional block diagram of the peak decoder stage in the circuit of FIG. 2.
Figure 12:
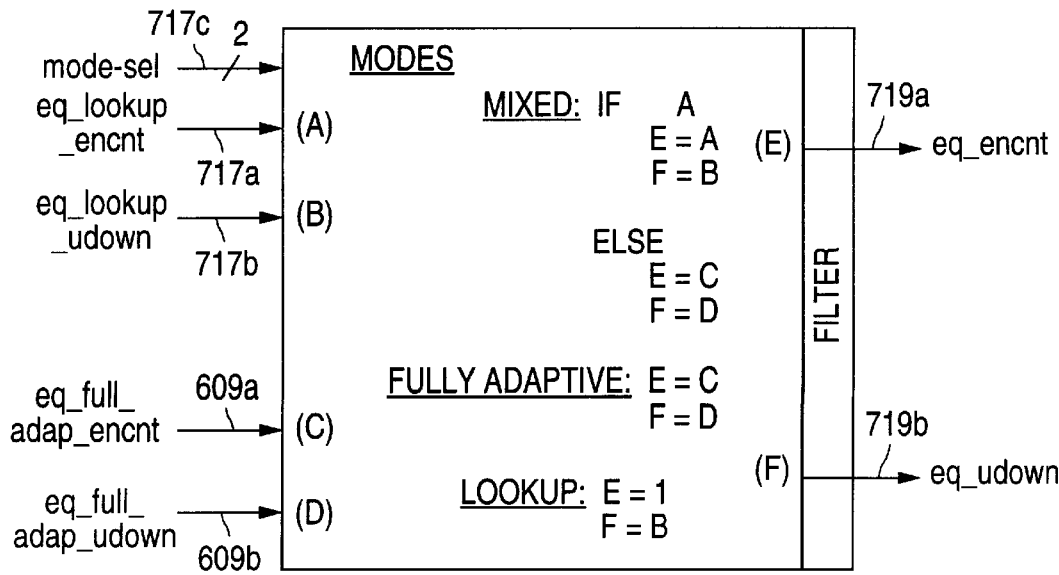
FIG. 12 is a functional block diagram of the equalizer filter stage in the circuit of FIG. 2.

Referring to FIG. 11, the peak decoder 716 processes the multiple bit count signal 155c from the counter 714, in accordance with the function as shown, to produce another counter enablement control signal 717a and another count direction control signal 717b. Referring to FIG. 12, these signals 717a, 717b are processed by the equalizer filter 718 along with the adaptive equalization control signals 609a, 609b from the digital signal processor 154a (discussed above) in accordance with the function as shown. A mode select signal 717c determines whether the equalizer filter 718 operates in a mixed mode, full adaptive mode or lookup mode of operation. Of the resulting filtered signals 719a, 719b, one signal 719a is used to enable and disable the second up/down counter 720, while the other signal 719b instructs the counter 720 to count up or down.

The output count signal 155b from the counter 720 controls the pulse densities of the modulated outputs of the pulse density modulator 156. The pulse density modulated output signals 157a, 157b are converted to analog signals 167, 169 by the digital-to-analog converters 166, 168. In accordance with the discussion above, these analog signals 167, 169 serve as the equalizer control signals for the adaptive equalizer and baseline wander corrector stage 102.

More specifically, this control loop controls the adaptive equalization of the incoming data signal 101 by operating in one of three modes: fully adaptive mode; lookup mode; and mixed mode. The peak decoder 716 and equalizer filter 718 together determine which equalization mode is to be used. In fully adaptive mode, equalization of the incoming data signal 101 is done in real time. The adaptive equalization control signals 609a, 609b from the digital signal processor 154a, which correspond to peak error signals generated in real time by the peak error detectors 308, 316, are used to control the second up/down counter 720. In lookup mode, equalization is done in accordance with the output count 155c of the first up/down counter stage 714 and is introduced only if the data signal peaks rise above or fall below defined upper and lower limits, respectively (discussed in more detail below). In mixed mode, the equalization function is always active and is performed in lookup mode when the data signal peaks rise above or fall below the defined upper and lower limits, respectively, and is performed in fully adaptive mode so long as the data signal peaks stay between such defined upper and lower limits.

Figure 13A:
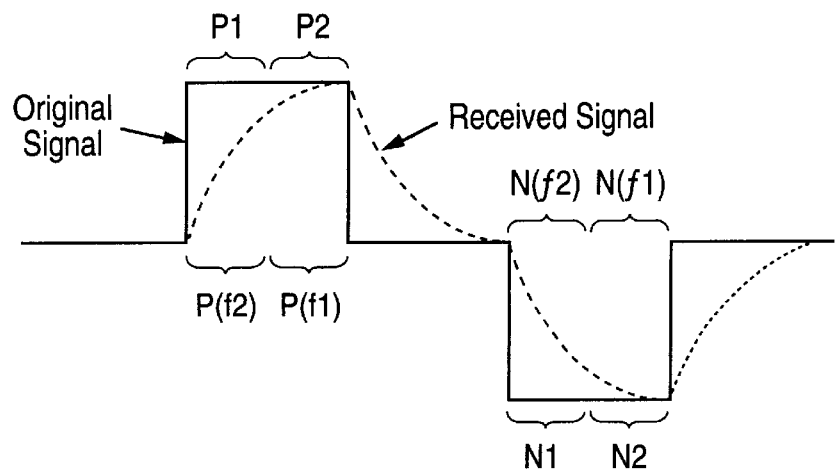
FIGS. 13A, 13B and 13C together illustrate the principles behind the adaptive equalization of a data signal.
Figure 13B:
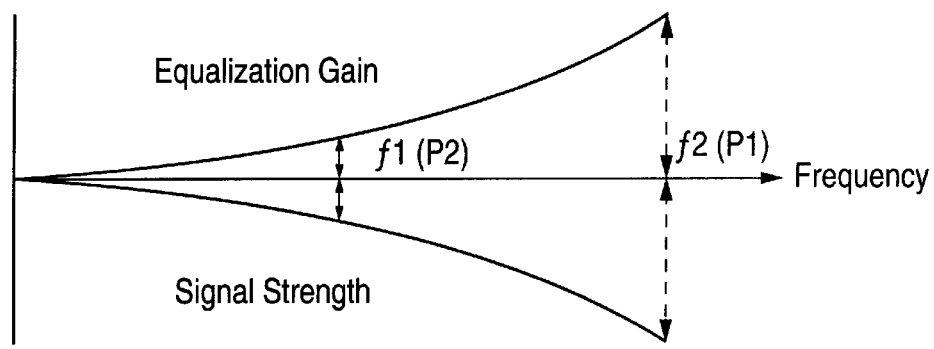

Referring to FIGS. 13A and 13B, such adaptive equalization of the incoming data signal 101 can be summarized as follows. After propagating down some length of cable, the waveshape of the received signal can be severely distorted as compared to the original signal waveshape. In particular, the early portions of the positive P(f2) and negative N(f2) pulses which correspond to the higher range f2 of frequencies can have significantly reduced signal strength due to the higher signal attenuation at such frequencies. In contrast, the later portions of the positive P(f1) and negative N(f1) pulses which correspond to the lower range f1 of frequencies may have only slightly reduced signal strength due to the lower signal attenuation at such frequencies. Accordingly, for those signal components in the higher range f2 of frequencies more equalization gain is required than for those signal components in the lower range f2 of frequencies.

Figure 13C:
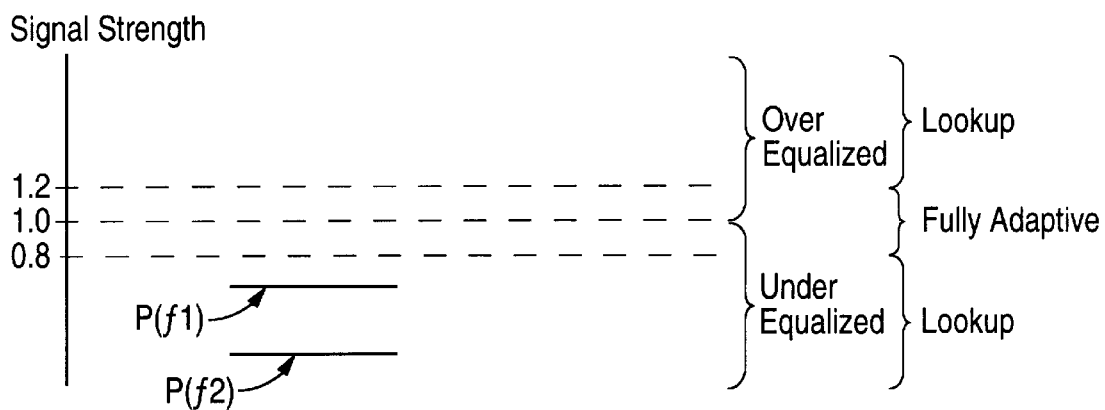

As noted above, the peak decoder 716 and equalizer filter 718 together determine the appropriate equalization mode. Referring to FIG. 13C, in one embodiment, the fully adaptive mode of operation is used so long as the signal peak level is within the range of +/−20% of the desired peak (i.e., within the range of 0.8–1.2 as compared to a normalized 1.0 level). Outside of that range (<0.8 or >1.2) the lookup mode is used until the signal peak level returns to within the desired +/−20% range.

Signal Peak Tracking Loop

Referring again to FIG. 2, the control loop for controlling the multiple level slicing, or detecting, of the equalized data signal 117 is completed by a pulse density modulator stage (PDM) 158, a digital-to-analog converter stage (DAC) 164 and non-inverting 130 and inverting 132 buffer amplifiers connected as shown. The output count signal 155c from the first up/down counter 714 drives the pulse density modulator 158. The pulse density modulated signal 159 provides a pulse stream with a pulse density which corresponds to the count value of the output count signal 155c and is converted to an analog signal by the digital-to-analog converter 164. The buffer amplifiers 130, 132, in accordance with this analog signal 165, generate the positive 131 and negative 133 data peak reference signals for the data signal slicer 104.

More specifically, this control loop for controlling the multiple level detection of the equalized data signal 117 functions as an adaptive dynamic signal stream processor which is frequency selective in its capturing of signal peak information. This frequency selectivity is achieved in the form of detecting the data signal during different time windows P1, P2, N1, N2 (FIG. 4) for the positive and negative data signal excursions. The data signal slicer 104, which effectively functions as an analog-to-digital signal converter, is dynamic due to the feedback in the form of the peak reference signals 131, 133 and provides, via its binary output signals 121, 123, 125, 127, 129, a time-varying digital representation of the equalized data signal 117. This, in turn, allows for dynamic peak error detection in which dynamic errors among peak levels of the equalized data signal 117 can be identified in different time windows using the dynamic signal slicing levels of the data signal slicer 104.

Signal activity on the part of the validation signals 603b, 605b (which identify when data signal peaks have been detected) is monitored for some defined period of time as determined by the bleed counter 702. If no validation signal 603b/605b activity occurs during such time, then the count direction signal 705c and counter enable/disable signal 705b from the add bleed stage 704 are generated so as to cause the counter 714 to begin counting down. This causes the peak reference signals 131, 133 to be adjusted via the PDM 158, DAC 164 and buffer amplifiers 130, 132, thereby resulting in an overall expansion or contraction of the differential voltage range represented by the positive 131 and negative 133 data peak reference signals. Hence, convergence of this control loop is based upon its zero-forcing nature which causes the dynamic slicing levels to match up with the corresponding portions of the equalized data signal 117 within the selected time windows.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a control loop for controlling an adaptive qualization of a data signal, comprising:

a signal equalization circuit configured to receive and process one or more equalization control signals and in accordance therewith receive and adaptively equalize an input data signal from a cable and in accordance therewith provide an equalized data signal which corresponds to said input data signal;

a data signal peak detection circuit, coupled to said signal equalization circuit, configured to receive and detect said equalized data signal and in accordance therewith provide a plurality of peak parameter signals which indicates whether said equalized data signal has transcended a plurality of predetermined signal levels including predetermined minimum and maximum signal levels;

a signal processing circuit, coupled to said data signal peak detection circuit, configured to receive and process said plurality of peak parameter signals and in accordance therewith provide a first processed parameter signal which indicates whether said equalized data signal has transcended one of said predetermined minimum and maximum signal levels, a second processed parameter signal which indicates which one of said predetermined minimum and maximum signal levels said equalized data signal has transcended, a third processed parameter signal which indicates whether said equalized data signal has transcended a first predetermined midrange signal level intermediate to a predetermined mean value of said equalized data signal and said predetermined maximum signal level, or has transcended a second predetermined midrange signal level intermediate to said predetermined mean value of said equalized data signal and said predetermined minimum signal level, and a fourth processed parameter signal which indicates which one of said first and second predetermined midrange signal levels said equalized data signal has transcended; and an equalization control circuit, coupled to said signal processing circuit and said signal equalization circuit, configured to receive and process said first, second, third and fourth processed parameter signals and in accordance therewith provide said one or more equalization control signals.

2. The apparatus of claim 1, wherein said data signal peak detection circuit comprises:

a positive peaks signal detector circuit configured to receive and detect said equalized data signal and in accordance therewith provide a portion of said plurality of peak parameter signals which indicates when said equalized data signal has transcended one or more of said plurality of predetermined signal levels which include said predetermined maximum signal level and which are more positive than said measured mean value of said equalized data signal; and a negative peaks signal detector circuit configured to receive and detect said equalized data signal and in accordance therewith provide a portion of said plurality of peak parameter signals which indicates when said equalized data signal has transcended one or more of said plurality of predetermined signal levels which include said predetermined minimum signal level and which are more negative than said measured mean value of said equalized data signal.

3. The apparatus of claim 1, wherein said equalization control circuit comprises:

an equalization loop control circuit configured to receive and process said first, second, third and fourth processed parameter signals and in accordance therewith provide a plurality of loop control signals; and a variable signal generator circuit, coupled to said equalization loop control circuit, configured to receive said plurality of loop control signals and in accordance therewith provide one or more variably increasing and decreasing analog signals as said one or more equalization control signals.

4. The apparatus of claim 3, wherein said equalization loop control circuit comprises:

an up/down counter circuit configured to receive said first and second processed parameter signals and in accordance therewith provide a variably increasing and decreasing digital count signal;

a first decoding circuit, coupled to said up/down counter circuit, configured to receive and decode said variably increasing and decreasing digital count signal and in accordance therewith provide a plurality of decoded signals; and a second decoding circuit, coupled to said first decoding circuit, configured to receive and further decode said plurality of decoded signals and said third and fourth processed parameter signals and in accordance therewith provide said plurality of loop control signals.

5. The apparatus of claim 3, wherein said variable signal generator circuit comprises:

an up/down counter circuit configured to receive said plurality of loop control signals and in accordance therewith provide a variably increasing and decreasing digital count signal; and a digital-to-analog conversion circuit, coupled to said up/down counter circuit, configured to receive and convert said variably increasing and decreasing digital count signal to said one or more variably increasing and decreasing analog signals.

6. The apparatus of claim 1, wherein said signal processing circuit comprises a pulse density modulation circuit configured to provide first and second pulse density modulated signals as said first and second processed parameter signals.

7. A method of controlling an adaptive equalization of a data signal with a control loop, comprising the steps of:

receiving and processing one or more equalization control signals and in accordance therewith receiving and adaptively equalizing an input data signal from a cable and in accordance therewith generating an equalized data signal which corresponds to said input data signal;

detecting said equalized data signal and in accordance therewith generating a plurality of peak parameter signals which indicates whether said equalized data signal has transcended a plurality of predetermined signal levels including predetermined minimum and maximum signal levels;

processing said plurality of peak parameter signals and in accordance therewith generating a first processed parameter signal which indicates whether said equalized data signal has transcended one of said predetermined minimum and maximum signal levels, a second processed parameter signal which indicates which one of said predetermined minimum and maximum signal levels said equalized data signal has transcended, a third processed parameter signal which indicates whether said equalized data signal has transcended a first predetermined midrange signal level intermediate to a predetermined mean value of said equalized data signal and said predetermined maximum signal level, or has transcended a second predetermined midrange signal level intermediate to said predetermined mean value of said equalized data signal and said predetermined minimum signal level, and a fourth processed parameter signal which indicates which one of said first and second predetermined midrange signal levels said equalized data signal has transcended; and processing said first, second, third and fourth processed parameter signals and in accordance therewith generating said one or more equalization control signals.

8. The method of claim 7, wherein said step of detecting said equalized data signal and in accordance therewith generating a plurality of peak parameter signals which indicates whether said equalized data signal has transcended a plurality of predetermined signal levels including predetermined minimum and maximum signal levels comprises:

detecting said equalized data signal and in accordance therewith generating a portion of said plurality of peak parameter signals which indicates when said equalized data signal has transcended one or more of said plurality of predetermined signal levels which include said predetermined maximum signal level and which are more positive than said measured mean value of said equalized data signal; and detecting said equalized data signal and in accordance therewith generating a portion of said plurality of peak parameter signals which indicates when said equalized data signal has transcended one or more of said plurality of predetermined signal levels which include said predetermined minimum signal level and which are more negative than said measured mean value of said equalized data signal.

9. The method of claim 7, wherein said step of processing said first, second, third and fourth processed parameter signals and in accordance therewith generating said one or more equalization control signals comprises:

processing said first, second, third and fourth processed parameter signals and in accordance therewith generating a plurality of loop control signals; and receiving said plurality of loop control signals and in accordance therewith generating one or more variably increasing and decreasing analog signals as said one or more equalization control signals.

10. The method of claim 9, wherein said step of processing said first, second, third and fourth processed parameter signals and in accordance therewith generating a plurality of loop control signals comprises:

receiving said first and second processed parameter signals and in accordance therewith generating a variably increasing and decreasing digital count signal;

decoding said variably increasing and decreasing digital count signal and in accordance therewith generating a plurality of decoded signals; and receiving and further decoding said plurality of decoded signals and said third and fourth processed parameter signals and in accordance therewith generating said plurality of loop control signals.

11. The method of claim 9, wherein said step of receiving said plurality of loop control signals and in accordance therewith generating one or more variably increasing and decreasing analog signals as said one or more equalization control signals comprises:

receiving said plurality of loop control signals and in accordance therewith generating a variably increasing and decreasing digital count signal; and converting said variably increasing and decreasing digital count signal to said one or more variably increasing and decreasing analog signals.

12. The method of claim 7, wherein said step of processing said plurality of peak parameter signals and in accordance therewith generating said first and second processed parameter signals comprises generating first and second pulse density modulated signals as said first and second processed parameter signals.

* * * * *

UNITED STATES PATENT AND TRADEMARK OFFICE
CERTIFICATE OF CORRECTION

PATENT NO : 6,167,080

DATED : December 26, 2000

INVENTOR(S) : Wong Hee et al.

It is certified that error appears in the above-identified patent and that said Letters Patent are hereby corrected as shown below:

In Col. 12, line 12, delete "qualization" and replace with --equalization--.

Signed and Sealed this

Twenty-ninth Day of May, 2001

Attest:

NICHOLAS P. GODICI

*Attesting Officer*     *Acting Director of the United States Patent and Trademark Office*